US012683949B1

(12) United States Patent
Faroque et al.

(10) Patent No.: US 12,683,949 B1
(45) Date of Patent: Jul. 14, 2026

(54) FULLY-MANAGED SECURE CONNECTIVITY AMONG CONSTITUENT SERVICES OF DISTRIBUTED APPLICATIONS

(71) Applicant: Amazon Technologies, Inc., Seattle, WA (US)

(72) Inventors: Md Omar Faroque, Frisco, TX (US); Benjamin Du, Kenmore, WA (US); Joseph Rice, Middleton, WI (US); Md Mazharul Islam, Seattle, WA (US); Carlos Batista, Alpharetta, GA (US); Alexandr Moroz, Vancouver (CA); Kevin Thomas Gibbs, Tumwater, WA (US)

(73) Assignee: Amazon Technologies, Inc., Seattle, WA (US)

( * ) Notice: Subject to any disclaimer, the term of this patent is extended or adjusted under 35 U.S.C. 154(b) by 213 days.

(21) Appl. No.: 18/464,958

(22) Filed: Sep. 11, 2023

(51) Int. Cl.
| | |
|---|---|
| *H04L 15/16* | (2006.01) |
| *G06F 9/455* | (2018.01) |
| *G06F 15/16* | (2006.01) |
| *H04L 9/40* | (2022.01) |

(52) U.S. Cl.
CPC ...... *H04L 63/0823* (2013.01); *G06F 9/45558* (2013.01); *H04L 63/166* (2013.01); *G06F 2009/45595* (2013.01); *H04L 2463/041* (2013.01)

(58) Field of Classification Search
CPC .............. H04L 63/0823; H04L 63/166; H04L 2463/041; G06F 9/45558; G06F 2009/45595

USPC ........................................................... 726/6
See application file for complete search history.

(56) References Cited

U.S. PATENT DOCUMENTS

| | | | |
|---|---|---|---|
| 9,519,520 | B2 | 12/2016 | Krueger |
| 10,250,522 | B1 | 4/2019 | Anderson |
| 10,505,815 | B2 | 12/2019 | Padala et al. |
| 10,630,489 | B2 | 4/2020 | Hughes |
| 10,805,213 | B2 | 10/2020 | Pilkington et al. |
| 10,977,100 | B2 | 4/2021 | Ambichl et al. |
| 10,986,150 | B2 | 4/2021 | Ithal et al. |
| 11,012,520 | B2 | 5/2021 | Gunjal et al. |
| 11,075,884 | B2 | 7/2021 | Feng et al. |

(Continued)

FOREIGN PATENT DOCUMENTS

WO    WO-2023020606 A1 *   2/2023   ............. H04L 67/60

*Primary Examiner* — Berhanu Shitayewoldetadik
(74) *Attorney, Agent, or Firm* — Robert C. Kowert; Kowert, Hood, Munyon, Rankin & Goetzel, P.C.

(57) ABSTRACT

A control plane server of a network-accessible service of a cloud provider network obtains an indication from a client that security artifacts to be used for establishing connections among constituent services of an application are to be obtained automatically by the service. The control plane server transmits, to a first agent established at a first resource at which a first constituent service of the application runs, a set of security artifacts obtained from an artifact source and assigned to the first constituent service by the control plane server. The set of artifacts is used to establish a connection between the first agent and a second agent at a second execution resource at which a second constituent service of the application runs. Messages between the constituent services are sent using the connection.

20 Claims, 10 Drawing Sheets

(56)          References Cited

U.S. PATENT DOCUMENTS

| | | | | |
|---|---|---|---|---|
| 11,635,995 | B2 | 4/2023 | Bahl et al. | |
| 2009/0016339 | A1* | 1/2009 | Tanizawa | H04M 3/54 |
| | | | | 370/389 |
| 2014/0359700 | A1* | 12/2014 | Krieger | H04L 63/166 |
| | | | | 709/227 |
| 2014/0372747 | A1* | 12/2014 | Krieger | H04L 63/168 |
| | | | | 713/151 |
| 2018/0091401 | A1* | 3/2018 | Richards | H04L 41/0631 |
| 2018/0091413 | A1* | 3/2018 | Richards | H04L 43/20 |
| 2019/0075099 | A1* | 3/2019 | Brouchier | H04L 63/166 |
| 2020/0099678 | A1* | 3/2020 | Brouchier | H04L 9/3234 |
| 2020/0310855 | A1* | 10/2020 | Liguori | G06F 9/45558 |
| 2021/0243178 | A1* | 8/2021 | Leach | H04L 63/0823 |
| 2021/0406071 | A1* | 12/2021 | Groenewald | G06F 9/54 |
| 2022/0245264 | A1* | 8/2022 | Tang | H04W 12/069 |
| 2024/0080242 | A1* | 3/2024 | Lee | H04L 47/803 |
| 2024/0080277 | A1* | 3/2024 | Lee | H04L 67/60 |
| 2025/0055710 | A1* | 2/2025 | Long | H04L 9/3268 |

* cited by examiner

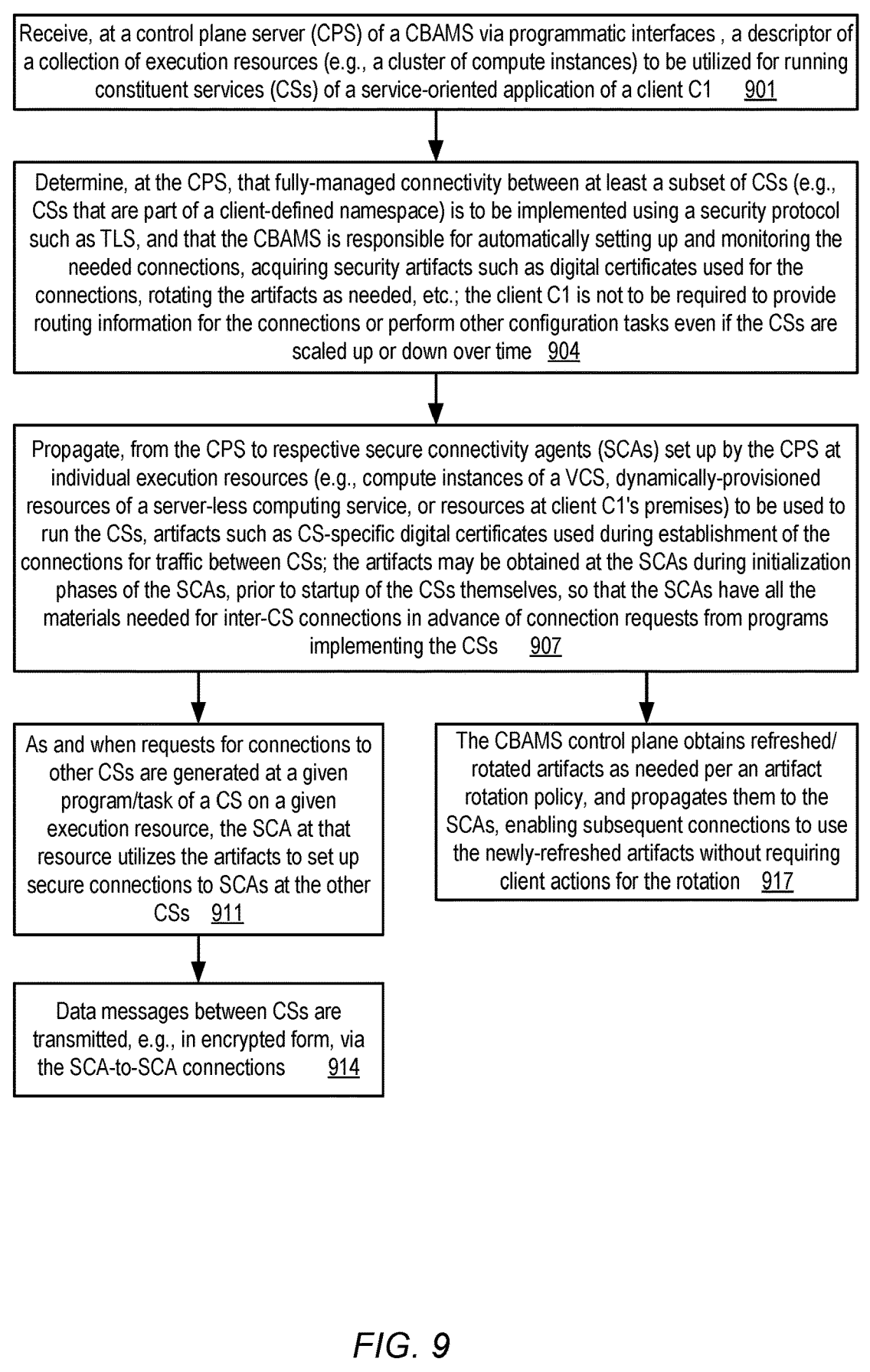

Receive, at a control plane server (CPS) of a CBAMS via programmatic interfaces , a descriptor of a collection of execution resources (e.g., a cluster of compute instances) to be utilized for running constituent services (CSs) of a service-oriented application of a client C1     901

Determine, at the CPS, that fully-managed connectivity between at least a subset of CSs (e.g., CSs that are part of a client-defined namespace) is to be implemented using a security protocol such as TLS, and that the CBAMS is responsible for automatically setting up and monitoring the needed connections, acquiring security artifacts such as digital certificates used for the connections, rotating the artifacts as needed, etc.; the client C1 is not to be required to provide routing information for the connections or perform other configuration tasks even if the CSs are scaled up or down over time   904

Propagate, from the CPS to respective secure connectivity agents (SCAs) set up by the CPS at individual execution resources (e.g., compute instances of a VCS, dynamically-provisioned resources of a server-less computing service, or resources at client C1's premises) to be used to run the CSs, artifacts such as CS-specific digital certificates used during establishment of the connections for traffic between CSs; the artifacts may be obtained at the SCAs during initialization phases of the SCAs, prior to startup of the CSs themselves, so that the SCAs have all the materials needed for inter-CS connections in advance of connection requests from programs implementing the CSs     907

As and when requests for connections to other CSs are generated at a given program/task of a CS on a given execution resource, the SCA at that resource utilizes the artifacts to set up secure connections to SCAs at the other CSs   911

The CBAMS control plane obtains refreshed/ rotated artifacts as needed per an artifact rotation policy, and propagates them to the SCAs, enabling subsequent connections to use the newly-refreshed artifacts without requiring client actions for the rotation   917

Data messages between CSs are transmitted, e.g., in encrypted form, via the SCA-to-SCA connections     914

*FIG. 9*

FULLY-MANAGED SECURE CONNECTIVITY AMONG CONSTITUENT SERVICES OF DISTRIBUTED APPLICATIONS

BACKGROUND

Many applications are implemented using a service-oriented architecture, with the logic of the application being distributed among numerous smaller-scale constituent services. A given constituent service typically exposes APIs (application programming interfaces) that can be invoked by other constituent services to request the functionality implemented by that constituent service. Details of how the functionality of each constituent service is implemented need not be exposed; the constituent service is only responsible for responding to the invocations of its APIs. The service-oriented methodology can provide many benefits, such as enabling small agile teams of software engineers to focus on enhancing features of the individual constituent services without having to wait for the entire application to be changed, making updates more manageable, reducing the risks and impacts of failures, making debugging easier, and so on.

BRIEF DESCRIPTION OF DRAWINGS

FIG. 9 is a flow diagram illustrating aspects of operations which may be performed to support managed secure connectivity between constituent services of an application, according to at least some embodiments.

Figure 1:
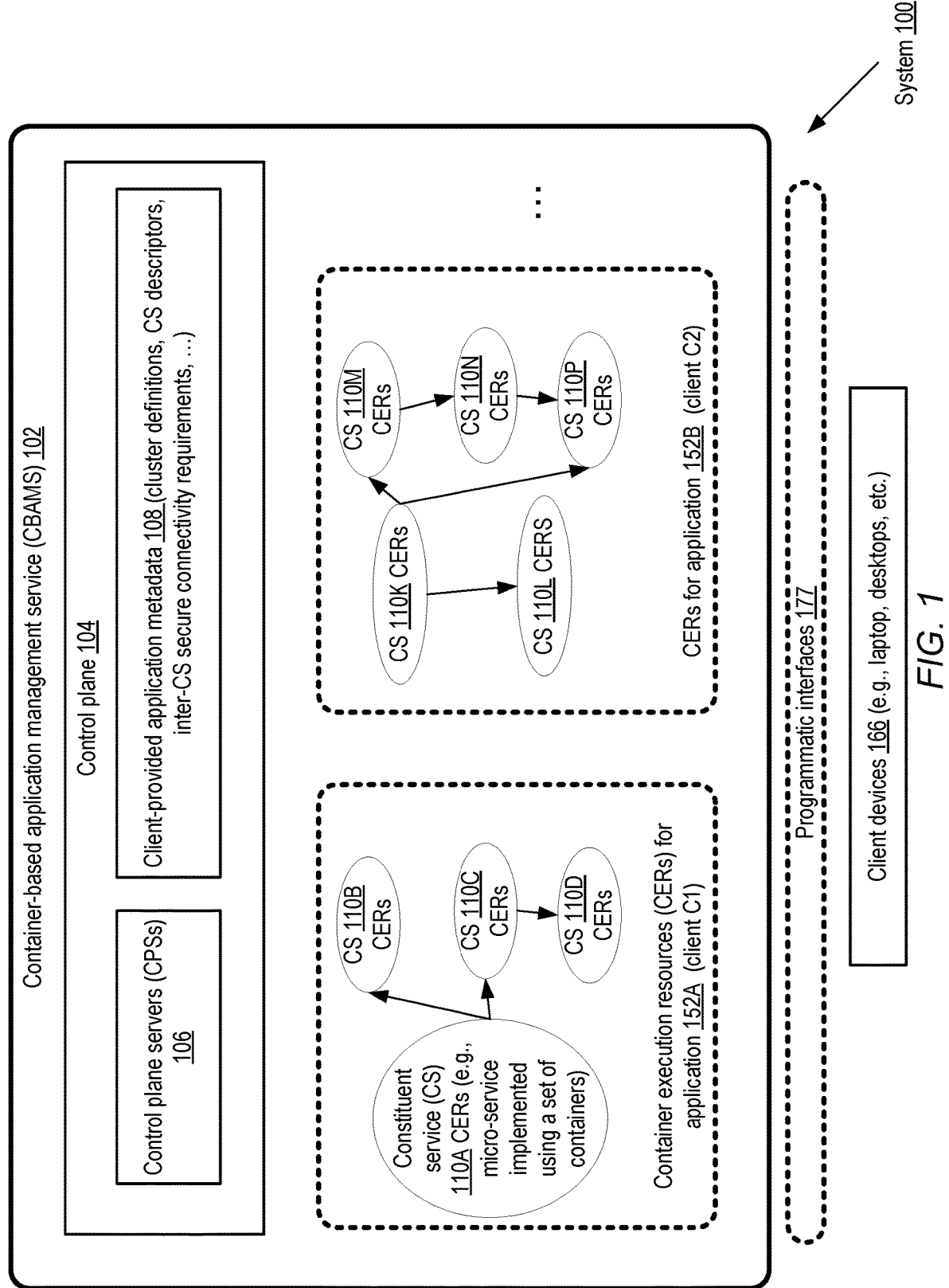
FIG. 1 illustrates an example system environment in which various types of tasks for enabling secure connectivity between constituent services of service-oriented applications may be performed automatically by a network-accessible service, thereby reducing the configuration-related effort required from customers on whose behalf the applications are run, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for providing fully-managed secure connectivity for network traffic among constituent services of distributed applications that implement a service-oriented architecture (SOA). The overall business logic of many large scale SOA applications can be implemented using a combination of numerous lower-level services accessible to one another over network connections, with each lower-level service often being executed at one or more software containers. The lower-level resources can each implement a part of the business logic in response to invocations of APIs (e.g., from other lower-level service or customers of the application). Note that a distributed application itself may be accessible to its clients via a network and its own APIs, and may thus be considered a service as well. To distinguish the distributed applications from the lower-level services that work together to implement the overall logic of the distributed applications, the lower-level services that constitute or form a distributed application are referred to as constituent services (CSs) of the distributed application herein.

To enhance overall security of a distributed application, an application owner may wish to encrypt the network traffic flowing between the CSs of an application, e.g., in accordance with a security protocol such as TLS (Transport Layer Security). In some conventional SOA implementations, if such secure connectivity is desired, the application owner has to perform several types of low-level configuration tasks, such as obtaining and distributing signed digital certificates to various CSs to enable establishment of TLS connections, setting up or selecting certificate authorities, keeping track of certificate expirations, determining routes to be used for the packets flowing between the CSs, setting up proxies for the CSs, and so on. For large-scale applications that may include hundreds of CSs, with each CS potentially running at several software containers at respective compute resources, the configuration effort required for secure inter-CS connectivity can become quite onerous and error-prone, especially if the set of resources used for the CSs changes over time to adapt to changed application workload levels.

To help reduce such problems, a multi-tenant network-accessible service which fully automates the establishment, monitoring and management of secure connections between CSs of various distributed SOA applications can be implemented at a cloud provider network or cloud computing environment. Customers of such a service, which can be referred to as a container-based application management service (CBAMS) or a distributed application management service, can simply provide logical descriptors of their applications (e.g., the types and sizes of compute resources or clusters to be used for a given application, the sets of CSs each application comprises, and so on), and indicate whether managed secure inter-CS connectivity is desired for some subset or all of the CSs of a given application. Control plane or administrative components of the service can then perform the tasks needed for securing the traffic between the CSs of a given application. For example, in a scenario in which individual ones of the CSs are executed using one or more software containers, with each such container being run at a given compute resource, the control plane can set up respective secure connectivity agents (SCAs) at each compute resource, acquire security artifacts (such as digital certificates) needed for TLS and similar protocols on behalf of the customer, and propagate the security artifacts such as digital certificates to the SCAs. The SCA at a given resource can communicate with the software container implementing the CS at that resource, for example to receive outbound messages destined for other CSs at other resources and to transmit inbound messages to the CS at the resource. When a program implementing a CS at a resource attempts to establish a connection with another target CS (e.g., using a fully-qualified domain name of the target CS or a shortened user-friendly version of the fully-qualified name), the SCA at that resource can use the security artifacts propagated earlier by the control plane to establish a connection of a security protocol such as TLS with an SCA of a resource at which the target CS runs. The network packets generated at either CS can then be transmitted in encrypted form over the security protocol connection between the two SCAs, passed on by the SCAs to the CSs for which they are intended, and processed at the CSs in accordance with the application business logic being implemented. The CBAMS can be described as a multi-tenant service in that it can manage secure connectivity for numerous CSs (e.g., hundreds or thousands of CSs) of a single distributed application, and multiple applications of different clients as well.

Based on a rotation or expiration protocol enforced at the CBAMS, the control plane can also obtain rotated/refreshed security artifacts before the expiration of the current artifacts, and these new artifacts can be used for establishing additional secure inter-CS connections as needed. If a connection which was established using the pre-rotation security artifacts remains in use, traffic can continue to flow on such a connection without disruption; the new security artifacts need only be used for establishing new connections. The control plane can encrypt the security artifacts sent to the SCAs, e.g., using cryptographic keys generated on behalf of the customer or indicated by the customer. Various cloud provider network services can be utilized by the CBAMS control plane to perform portions of the tasks required for fully-managed secure connectivity between the CSs—e.g., a cloud-based certificate authority service can be used to sign digital certificates, a key management service can be used to obtain cryptographic keys, a secrets management service can be used to store the security artifacts using the application owner's account, and so on. The CBAMS can ensure that security secrets that are utilized for the inter-CS traffic of the customer's application are stored and transmitted in encrypted form, using customer-specific encryption keys that are not accessible to the CBAMS, to further enhance the security of the customer's distributed container-based application.

As one skilled in the art will appreciate in light of this disclosure, certain embodiments may be capable of achieving various advantages, including some or all of the following: (a) shortening the time taken to bring SOA applications that require encrypted communication between constituent services online, (b) reducing the probability of networking misconfigurations that can lead to errors within large distributed applications and/or (b) enhancing the overall security of large distributed applications. The owners of the SOA applications may not have to perform potentially error-prone or laborious configuration tasks such as obtaining/rotating digital certificates and other security artifacts, configuring proxies and routes for inter-constituent services, setting up load balancers for traffic between constituent services, and so on.

According to some embodiments, a system may comprise one or more control plane servers (CPSs) of an application management service (AMS) of a cloud computing environment or cloud provider network, and a plurality of container execution resources (CERs). Examples of CERs may include, among others, compute instances or virtual machines of a virtualized computing service (VCS) of the cloud computing environment, servers located at premises of clients of the provider network, and/or dynamically acquired compute resources of a server-less computing service of the provider network. The CPSs and the CERs may each comprise some combination of software and hardware of one or more computing devices in various embodiments.

A CPS may be configured to obtain, from a client of the AMS, a programmatic indication that a plurality of CSs of an application of the client is to be executed using at least the plurality of CERs in various embodiments. The CPS may also obtain programmatic input from the client indicating that connectivity between individual CSs of the plurality of constituent services is to be established using TLS, without obtaining networking configuration information of the individual constituent services from the client. In at least some embodiments, the input provided by the client may implicitly or explicitly indicate that digital certificates for establishment of TLS connections among pairs of CSs are to be obtained and rotated automatically by the AMS, without receiving requests or input pertaining to individual digital certificates from the client. In some embodiments, the client may simply check off a box on a graphical interface of the AMS, indicating that managed secure connectivity is desired for a collection of CSs, and this input may be interpreted by the CPS to mean that TLS is to be used for inter-CS traffic and that all aspects of certificate management for TLS are to be handled by the AMS. In some cases, the client's secure connectivity requirements may be motivated at least in part by applicable regulations—e.g., laws governing the kinds of distributed applications being implemented on the client's behalf may have stringent security requirements which may be satisfied using TLS and/or other similar protocols.

In at least some embodiments, a CPS may propagate, to a first secure connectivity agent (SCA) established by the application management service at a first CER of the system, without receiving a request from the client to establish the first SCA, a first digital certificate assigned by the CPS to a first CS of the plurality of constituent services. The first digital certificate may be generated by a certificate authority at the request of the CPS in some embodiments. The first digital certificate may be propagated to the first SCA during an initialization phase of the first SCA in some embodiments, prior to initiation of communication between a first program implementing the first CS within a first container at the first CER and other programs implementing other CSs of the application. In some implementations, one of the steps of initializing a SCA may comprise the SCA sending a request to a CPS requesting that artifacts such as digital certificates and asymmetric keys be provided, and the requested artifacts may be obtained in response to such a request. In at least some embodiments, networking configuration information (such as Internet Protocol (IP) addresses) of the different SCAs that a given SCA may have to communicate with may also be provided by the CBAMS control plane to the given SCA. At some point after the first digital certificate is propagated to the first SCA, in some embodiments the CPS may determine that a criterion for automated certificate rotation has been satisfied by the first CS. In such a scenario, the CPS may propagate, to the first SCA, a second digital certificate assigned by the CPS to the first CS; the second digital certificate may also be generated by the certificate authority at the request of the CPS in various embodiments.

In at least one embodiment, the SCA at the first CER may establish, using the first digital certificate, prior to receiving the second digital certificate, a first TLS connection with a second SCA at a second CER which is used to run a second CS of the application. Such a connection may be established, for example, when a request to connect to the second CS (as identified by a user-friendly name assigned to the second service by the developers of the application) is reached within the code implementing the first CS. Such a connection establishment request may in effect be intercepted by the first SCA, and the first SCA may establish the connection using the security artifacts and networking configuration information (e.g., information enabling translation of the user-friendly name of the second CS to an IP address of the second SCA which is associated with the second CS) provided automatically to the SCA by the CBAMS control plane. The first SCA may transmit, via the first TLS connection, to the second SCA, one or more messages generated at the first program and directed to a second program implementing the second CS at a second container on the second CER. After the second digital certificate is received at the first SCA, that second certificate may be used to establish additional connections with SCAs (such as the second SCA) associated with other CSs. Such additional connections may also be used to transmit messages between programs implementing various CSs of the application. Note that the existence and use of the SCAs may be completely hidden from the programs that implement the CSs themselves in various embodiments; no changes may be needed in the CS code to benefit from the fully-managed secure connectivity enablement techniques described herein.

In some embodiments, the client or customer on whose behalf the CSs of the application are run may, if desired, provide additional configuration information utilized for securing the inter-CS traffic. For example, in some embodiments, the client may indicate the certificate authority to be used for the digital certificates, or sources of other security artifacts. In at least one embodiment, one or more of the sources of security artifacts (e.g., a certificate authority) may be located at a premise external to the provider network, such as an office, data center or other premise of the client. In one embodiment, a CPS may establish and/or utilize a private certificate authority set up on behalf of the client at a cloud service for digital certificates used for at least some CSs. In another embodiment, the client may set up a private CA in advance using the cloud service, and inform the CBAMS about the pre-created private CA. In some embodiments, the security artifacts provided by the CPS to an SCA may include a list of trusted CAs.

In various embodiments, at least a portion of the artifacts used for establishing secure connections may themselves be stored and transmitted in encrypted form, e.g., when being sent to an SCA. In some embodiments, the client may provide an identifier of a symmetric cryptographic key (not the key itself, just an identifier of the key) which is to be used for such encryption of the artifacts. While the artifacts may be encrypted using the key on behalf of the client, the CPS itself may not be able to decrypt the artifacts as it may not have access to the key itself in such embodiments. In other embodiments, the CPS may acquire such a key from a key management service of the cloud provider network on behalf of the client. In some embodiments, encrypted versions of the security artifacts may be stored under the client's account at a secrets management service of the provider network. In one embodiment, the client may specify the encryption algorithm to be used for encrypting/decrypting the messages sent between various CSs. In some embodiments, the client may specify a rotation policy or expiration policy for security artifacts used for the connections between CSs, and the artifacts may be rotated and expired by the CPSs based on such policies. The CPSs may in effect keep track of the pending expirations of the security artifacts being used for different clients, and take actions to rotate or renew the artifacts in advance of their expirations. In at least one embodiment, the SCAs may act not just as connectivity providers but also as load balancers—e.g., a given CS may be implemented using a plurality of CERs, and an SCA may choose the destination CER for a given inter-CS message based on load balancing considerations or policies. In at least one embodiment, mutual TLS or mTLS may be used for inter-CS connections between SCAs.

In at least some embodiments, as indicated above, an AMS may be implemented as one of a suite of services of a cloud provider network or cloud computing environment. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, compute instances of a VCS, which may be utilized for implementing CERs, may be launched within a VCS region, at an edge location of the VCS, or at a VCS extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region.

Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned or customer-owned premise at which one or more data plane servers at which VCS compute instances can be launched are located. Special highly secure channels using various kinds of tunneling technologies may be established for transmitting commands (e.g., commands to launch compute instances and/or containers) from the control plane servers of the VCS (which remain at provider network data centers) to the extension location data plane servers in various embodiments.

The cloud provider network may implement various computing resources or services, which may include, in addition to the AMS and the VCS, data processing service(s) (e.g., map reduce, data flow, and/or other large scale data processing techniques), data storage services (e.g., object storage services, block-based storage services, or data warehouse storage services), software container management services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services including the VCS and the AMS may be implemented at one or more data centers, edge locations and/or extension locations of the provider network in different embodiments. The VCS may also be referred to as an elastic compute cloud service, an elastic compute service, a virtual machines service, a computing cloud service, a compute engine, or a cloud compute service. Such a service may offer compute instances (also referred to as guest virtual machines, or simply "instances") with varying computational and/or memory resources, which are managed by the service. In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, database services, wide area networking (WAN) services and the like may also be implemented at the cloud provider network in some embodiments.

In some embodiments, as indicated above, resources of the cloud provider network may be used to run software containers on behalf of clients. A software container represents a logical packaging of a software application that abstracts an application from the computing environment in which the application is executed. For example, a containerized version of a software application can include the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. The orchestration of such containerized applications may be conducted by a container management service or a container orchestration service of the provider network.

The traffic and operations of the cloud provider network (or individual services of the cloud provider network, including an AMS) may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a VCS) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which various types of tasks for enabling secure connectivity between constituent services of service-oriented applications may be performed automatically by a network-accessible service, thereby reducing the configuration-related effort required from customers on whose behalf the applications are run, according to at least some embodiments. As shown, system 100 comprises resources and artifacts of a container-based application management service (CBAMS) 102. The control plane 104 of the CBAMS may include a set of control plane servers (CPSs) 106 and client-provided application metadata 108 pertaining to applications which are to be managed by the CBAMS in the depicted embodiment. The application metadata may include, for example, definitions/specifications of clusters of compute resources at which containers used for the constituent services (CSs) of the applications are to be executed, descriptors of the CSs (e.g., which containers are to be used for which CSs), inter-CS managed connectivity requirements. The CBAMS may implement a set of programmatic interfaces 177, such as web-based consoles, command-line tools, APIs, graphical user interfaces and the like which can be used by CBAMS customers or clients such as the owners of various distributed applications to submit requests and messages pertaining to their applications, and to receive corresponding responses. Clients may submit such requests from a variety of client devices 166 such as desktops, laptops, and the like in various embodiments. The requests and messages submitted by the clients may be processed by CPSs 106 in various embodiments.

The CBAMS may enable large distributed applications of CBAMS clients to be executed using various kinds of container execution resources (CERs) organized into clusters in the depicted embodiment. Examples of CERs may include, for example, pre-provisioned virtual machines (compute instances) of a cloud provider network's virtualized computing service, compute environments that are provisioned/allocated dynamically by server-less computing services of a cloud provider network, computing devices located at premises external to the data centers at which the CBAMS is implemented (such as client-owned data centers), and so on. A given client application implemented in accordance with a service-oriented architecture may include several communicating CSs. For example, an application 152A of a client C1 may comprise CS 110A, CS 110B, CS 110C and CS 110D, while application 152B of another client C2 may comprise CS 110K, CS 110L, CS 110M, CS 110N, and CS 110P. In the examples shown in FIG. 1, arrows from the CERs used for one CS to the CERs used for another CS indicate flows of inter-CS request messages which may be transmitted to fulfill the business logic requirements of the applications. For example, in application 152A, requests may be sent from CS 110A to CS 110B, from CS 110A to CS 110C, and from CS 110C to CS 110D. Similarly, in application 152B, inter-CS requests may be sent from CS 110K to CS 110L, CS 110M and CS 110P, from CS 110M to CS 110N, and from CS 110N to CS 110P. While only a few CSs are illustrated in FIG. 1 for a given application, in practice some applications may have hundreds or even thousands of CSs, with each CS being executed using a dynamically re-sizeable fleet of CERs. The CPSs may be responsible for, among other tasks, monitoring the health status (e.g., responsiveness) of various CERs and adding/removing/re-configuring CERs as needed in accordance with the client-provided application metadata 108 in the depicted embodiment.

In various embodiments, a CPS may obtain an indication from a client, via the programmatic interfaces 177, that connectivity between at least some CSs of an application of that client is to be established using a security protocol such as TLS, and that digital certificates and/or other security artifacts needed for the establishment of such connections are to be automatically acquired (and as needed, rotated) by the CBAMS, with minimum or no additional input regarding lower-level configuration operations being provided by the client. The client may, for example, not be required to provide networking details (such as network addresses, routing information etc.) needed for the connections, or to provide the security artifacts. In at least some embodiments, the client may simply provide an indication that fully-managed secure connectivity among an application's CSs is to be enabled, leaving the details to the CBAMS.

The CPSs of the CBAMS may take several types of actions to satisfy the managed secure connectivity requirements indicated by the client in the depicted embodiment. For example, a respective secure connectivity agent (SCA), comprising for example one or more processes or threads of execution, may be launched at individual ones of the CERs. The CPS may acquire one or more security artifacts (such as digital certificates, cryptographic keys, etc.) from an artifact source (such as a certificate authority or a key service) for individual ones of the CSs. In one example scenario, the CPS may send a request for a digital certificate to a certificate authority (CA) selected by the client via programmatic interfaces. In one embodiment, a client may specify a chain of CAs, and that chain may be used as the chain of trust for the certificates used. During an initialization phase of an SCA at a given CER, a CPS may propagate a digital certificate (which is assigned or allocated by the CPS to a given CS) to an SCA at a CER where the programs of that CS are run in some embodiments. The artifacts needed for establishing secure connections using the protocol of the client's choice (such as TLS) may thereby be made available in advance (prior to initiation of data plane traffic of the application) at each CER in such embodiment, so that the connections can be set up as quickly as possible when the CS programs request connection establishments. The actual connections between the CERs may be set up by respective SCAs, acting as intermediaries between programs implementing the logic of the CSs. Note that in some embodiments, while all the SCAs of the CERs used for the different CSs of an application may be provided the security artifacts which would be required for establishing secure inter-CS connections to any of the other CSs, the actual number of connections that are established and used during any given time interval may be much smaller than the theoretical maximum number of such connections. An actual connection may be established if and only if a request to establish an inter-CS connection is generated by a program implementing a CS in various embodiments; in general, not all the CSs may need to communicate with all the other CSs.

In addition to propagating the initial set of security artifacts needed for establishing secure connections for inter-CS traffic to the corresponding SCAs, the CPSs may also propagate new or refreshed versions of the security artifacts to the SCAs in various embodiments. For example, at some point after a particular certificate is propagated to an SCA, a CPS may determine that a criterion for automated certificate rotation has been satisfied (e.g., if the expiration of the particular certificate is scheduled within a specified interval with respect to the current time). Based on such a determination, the CPS may acquire a new certificate from the certificate authority, and propagate the new certificate to the SCA. The SCA may then use the new certificate for subsequently-established secure connections. The flow of traffic via existing secure connections which were established using the older certificate may continue without disruption in various embodiments.

When a program implementing a particular CS CS-A, running at a particular CER CER-1, generates a request to connect to another CS CS-B, the SCA SCA-1 at CER-1 may in effect intercept the request. SCA-1 may identify (e.g., using configuration information of CS-B, provided by a CPS to SCA-1 and in some cases a load balancing algorithm) a particular CER CER-2 at which CS-B is implemented. SCA-1 may then establish a secure TLS or mTLS connection with the SCA SCA-1 running at CER-2, using the latest security artifacts available at SCA-1 and SCA-2. Messages generated at programs implementing CS-A on CER-1 may be transmitted to programs implementing CS-B on CER-2 via the secure connection established between SCA-1 and SCA-2. Similarly, messages generated at programs implementing CS-B on CER-2 may be transmitted to programs implementing CS-A on CER-1 via the secure connection. Note that in some implementations, a digital certificate may only be required from the "server" side of a TLS connection (the SCA that responds to a connection establishment request from another SCA). In other implementations, digital certificates may be sent from both SCAs to each other during the connection establishment.

In some embodiments, the client on whose behalf the distributed application is run may specify the certificate authority (and/or other artifact sources) from which the artifacts needed for secure connection establishment should be obtained by CPSs. In one embodiment in which the CBAMS is one of a suite of network-accessible services of a provider network, the artifact source may be located at a premise (e.g., a premise of the client) outside the provider network. In some embodiments, the provider network may include a private certificate authority (PCA) service, and a PCA established at such a service may be used as an artifact source. In one embodiment, the CBAMS control plane may create such a PCA on behalf of the client; that is, the client may not even be required to configure a PCA or inform the CBAMS about the CA to be used for the certificates needed for a given application.

In at least some embodiments, one or more of the security artifacts needed for secure connection establishment may be sent to the SCAs in encrypted form from the CBAMS control plane, or at the request of the CBAMS control plane. In some embodiments, the client on whose behalf the application is being executed may provide an identifier of a cryptographic key (not the key itself) which is to be used for encrypting the security artifacts, and the CBAMS may cause the corresponding key to be used for encrypting the security artifacts. In some embodiments, a key management service of a provider network may be used to generate and/or store some of the cryptographic keys used for secure connections.

In one embodiment, an encryption algorithm to be used for encrypting the messages sent between the CSs via the secure connections may be indicated programmatically by the client to the CBAMS. In some embodiments, at least some security artifacts used for the connections may be stored in encrypted form within a secrets management service implemented at a provider network, e.g., using an account identifier of the client. The keys required to decrypt such security artifacts may not be accessible to the CBAMS control plane in some embodiment. Such encrypted versions of the security artifacts may be transmitted to the SCA by the CBAMS control plane in at least one embodiment.

Figure 2:
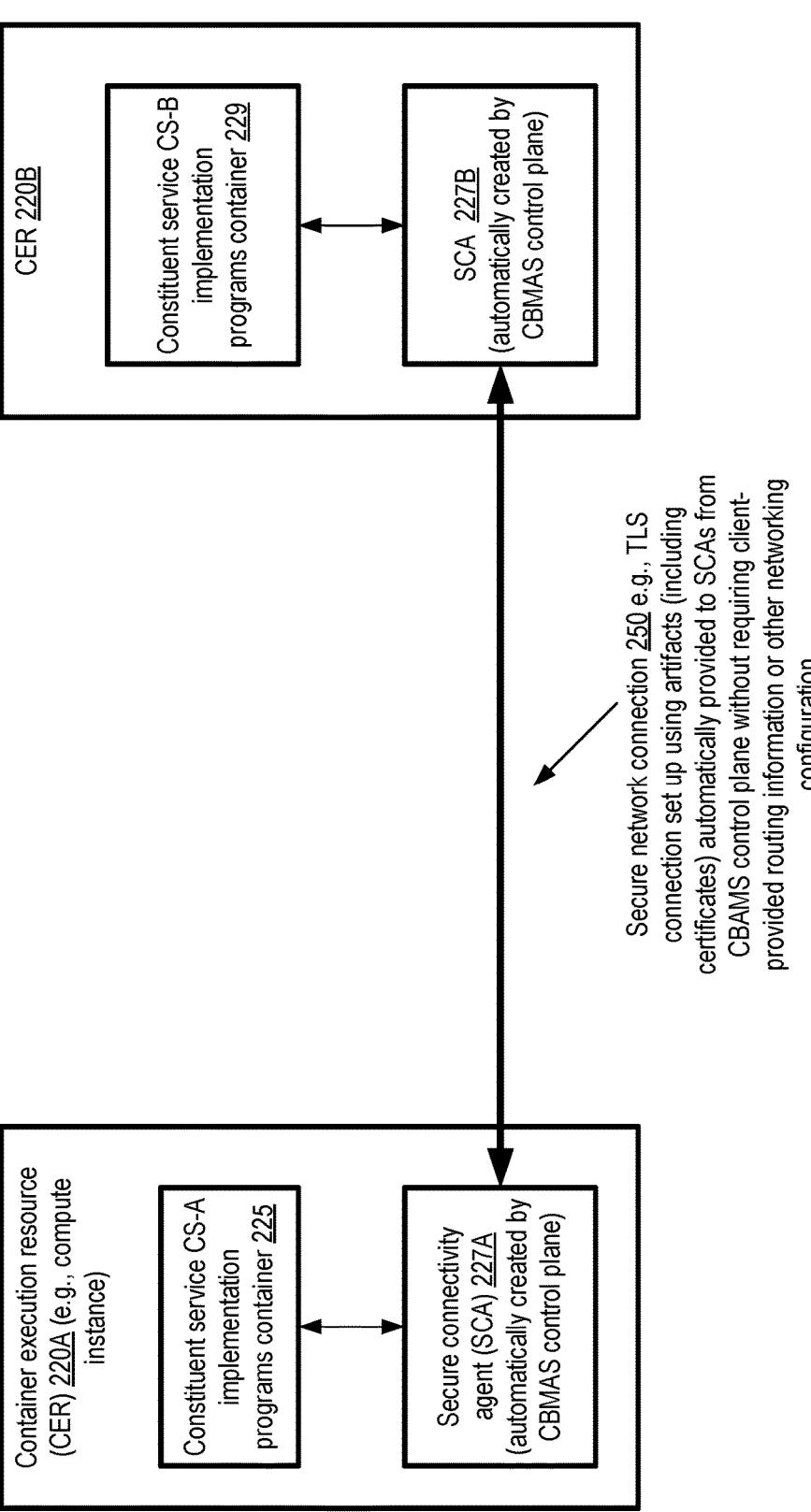
FIG. 2 illustrates an example scenario in which respective secure connectivity agents may be configured automatically for transmitting encrypted network packets between software containers at which constituent services of service-oriented applications are run, according to at least some embodiments.

FIG. 2 illustrates an example scenario in which respective secure connectivity agents may be configured automatically for transmitting encrypted network packets between software containers at which constituent services of service-oriented applications are run, according to at least some embodiments. In the depicted scenario, programs implementing at least a portion of a first constituent service CS-A of a distributed application are run within a software container 225 at a CER 220A, and programs implementing at least a portion of a second constituent service CS-B of the distributed application are run within a software container 229 at CER 220B. As mentioned earlier, any of several types of compute infrastructure components may be used as CERs in different embodiments, e.g., based on parameters specified by the owner of the distributed application when creating compute clusters to be used for the application. Some CERs may comprise compute instances of cloud-based virtualized computing services; other CERs may comprise dynamically provisioned and dynamically allocated computing devices selected by server-less computing services, and yet other CERs may comprise computing devices within client premises. In at least some embodiment, two or more different types of CERs may be used for a given distributed application.

Upon determining, by the CBAMS control plane, that fully managed secure network connectivity is desired by the client for the CSs of the distributed application, a respective secure connectivity agent SCA such as SCA 227A or SCA 227B may be automatically established or created at individual ones of the CERs. The client on whose behalf the CSs are run may not have to request the creation of the SCAs in at least some embodiments; instead, the SCAs may be created as part of the operations undertaken by the control plane to fulfill the request for fully managed connectivity. Based on actions of the CBAMS control plane, a given SCA such as 227A or SCA 227B may be provided security artifacts (such as digital certificates and associated cryptographic keys) and networking configuration information (e.g., Internet Protocol addresses) that can be used to establish TLS or mTLS connections (or connections of other similar protocols) with any other SCA set up at the CERs of the CSs for which secure connectivity is to be enabled in the depicted embodiment. When a program running in one of the CS implementation container such as 225 requests connectivity to a different CS (e.g., using an alias or fully-qualified domain name associated with the target CS), the SCAs at the two CERs 220A and 220B may collaborate to establish a secure network connection 250 using the artifacts provided to the SCAs. Clients on whose behalf the secure connections are to be established need not provide any low-level configuration information such as IP addresses, routing information etc. After the secure network connection is established, network packets originating at either container (container 225 or 229) may be sent in encrypted form over the connection to the other container in the depicted embodiment. A given SCA may establish such connections with multiple other SCAs associate with one or more CSs in some embodiments. In at least one embodiment, a given CS such as CS-A may be implemented at multiple CERs, and an SCA associated with another such as CS-B may establish secure connections with multiple ones of the SCAs at those CERs. In at least some embodiments, an SCA may be implemented using one or more processes or threads.

Figure 3:
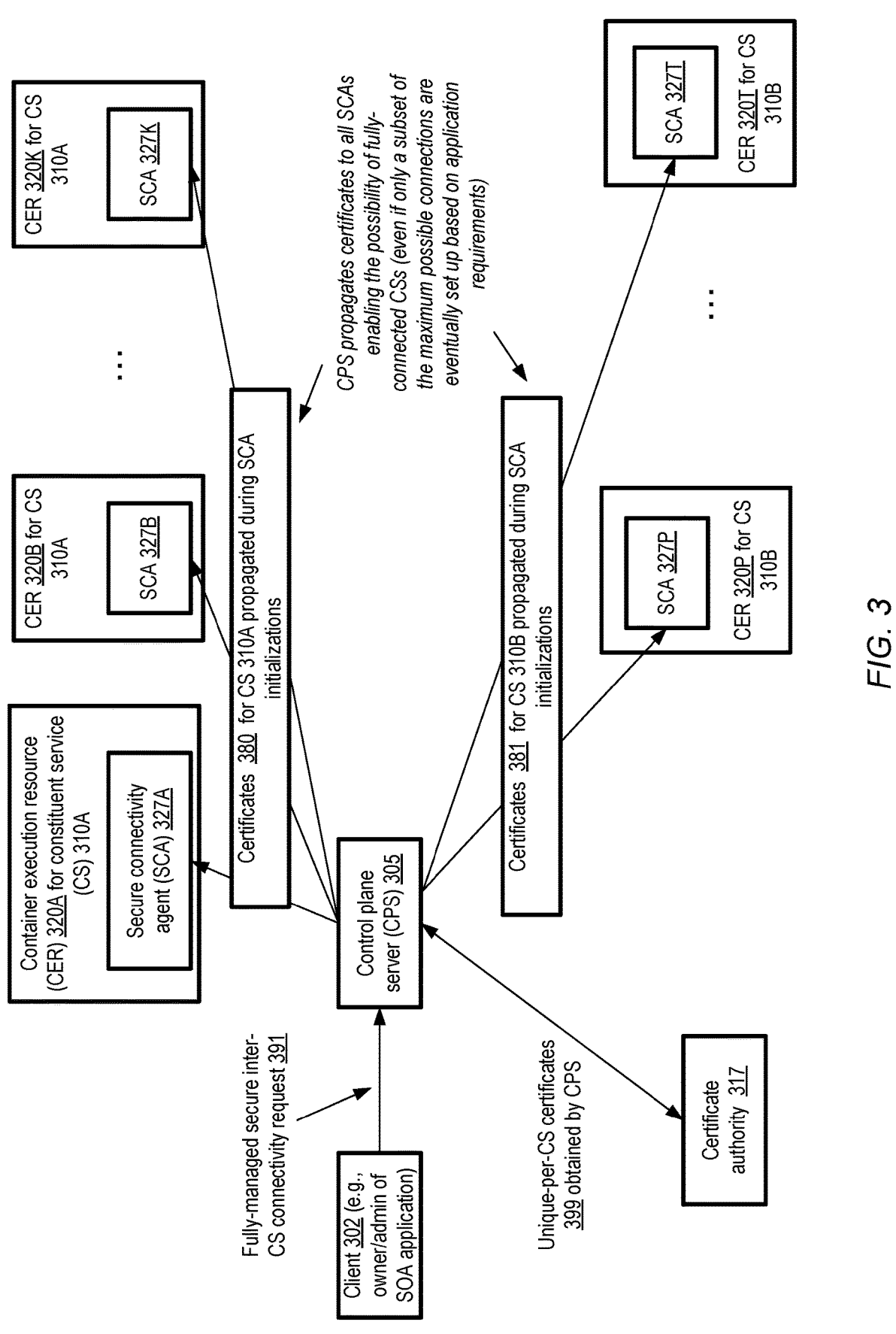
FIG. 3 illustrates an example of an initial distribution of digital certificates to secure connectivity agents from a control plane server of a container-based application management service, according to at least some embodiments.

FIG. 3 illustrates an example of an initial distribution of digital certificates to secure connectivity agents from a control plane server of a container-based application management service, according to at least some embodiments. In the depicted scenario, a client 302 (such as an owner or administrator of an SOA application) may submit a fully-managed secure inter-CS connectivity request 391 to a CBAMS which comprises a CPS 305. Respective software containers implementing a CS 310A of the application may be executed at CERs 320A, 320B and 320K, while respective software containers implementing another CS 310B of the application may be executed at CERs 320P and 320T In response to determining that fully-managed secure connectivity is desired, the CPS 305 may obtain unique-per-CS certificates 399 from a selected certificate authority 317 in the depicted embodiment. That is, respective distinct certificates may be obtained for CS 310A and CS 310B. The CPS may then propagate the certificates to the SCAs which are automatically established by the CPS at the CERs used for the CSs. For example, certificates 380 generated for CS 310A may be propagated, during initialization of SCAs 327A, 327B and 327K, prior to the initiation of data plane message transfers of CS 310A. Similarly, certificates 381 for CS 310B may be propagated to SCAs 327P and 327T during initialization phases of those SCAs. The CPS may propagate certificates to all SCAs in the depicted embodiment, enabling the possibility of fully-connected CSs (connections enabling traffic to flow from any CER implementing a given CS to any other CER implementing any other CS of the same application), even if only a subset of the maximum possible connections is eventually set up, based on application requirements in the depicted embodiment. In effect, the in-advance propagation of the certificates may prepare enable secure connections to be established quickly between any two CERs, without having to wait for certificates at the times that the connections are needed.

Figure 4:
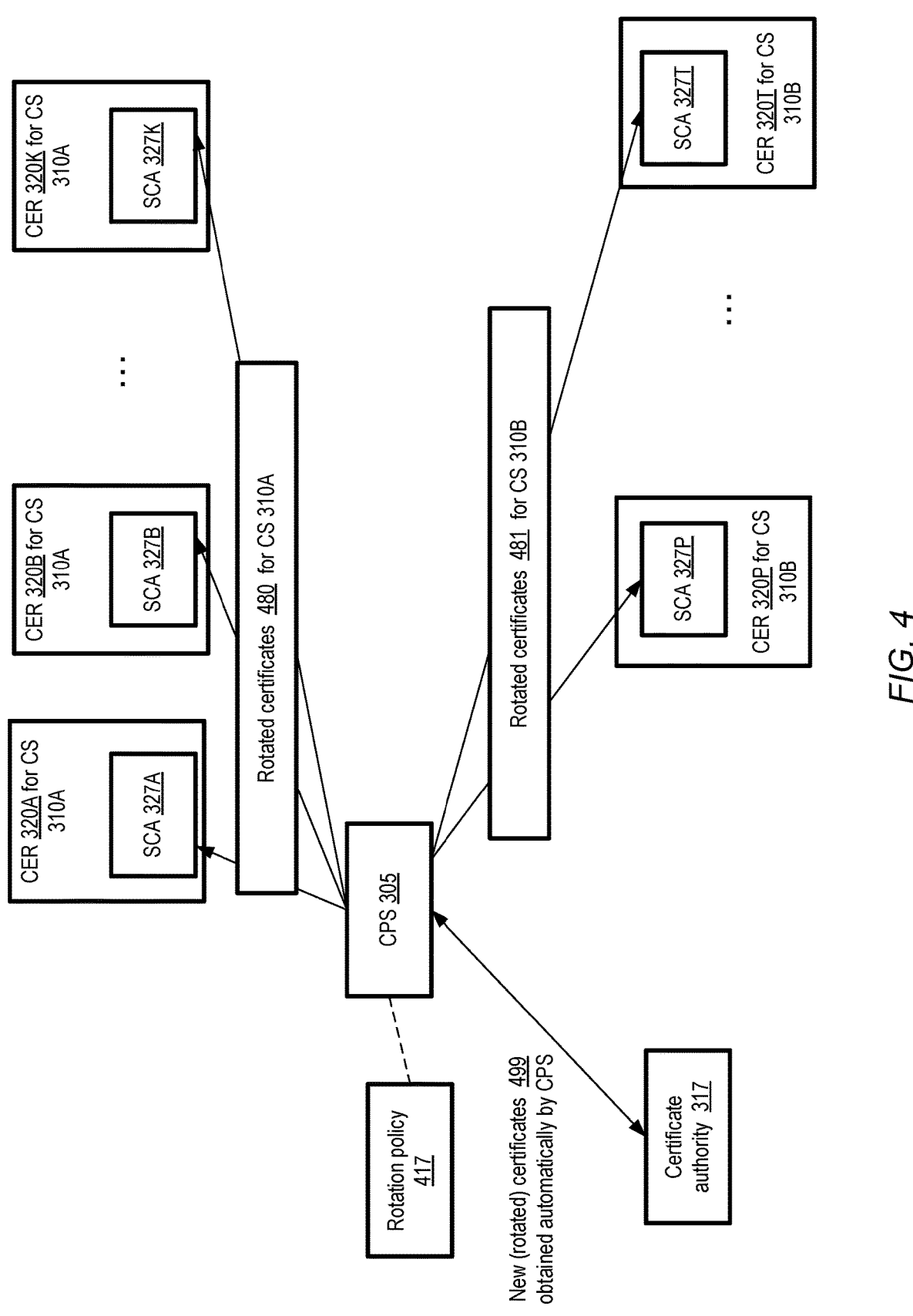
FIG. 4 illustrates an example of automated rotation of digital certificates, orchestrated by a control plane server of a container-based application management service, according to at least some embodiments.

FIG. 4 illustrates an example of automated rotation of digital certificates, orchestrated by a control plane server of a container-based application management service, according to at least some embodiments. A rotation policy 417 applicable to the CSs 310A and 310B of a distributed application of a client of a CBAMS may be enforced automatically by CPS 305 in the depicted embodiment, without requiring the client to keep track of the rotation policy and take corresponding actions to apply the policy. Having propagated the initial set of digital certificates as indicated in FIG. 3, the CPS 305 may later automatically obtain new (rotated) certificates 499 from the certificate authority 317 in a timely manner, e.g., at some time before the expiration of the initial set of certificates. The CPS may also store metadata indicating where individual ones of the rotated certificates are to be propagated.

Rotated certificates 480 for CS 310A may be propagated by the CPS to SCAs 327A, 327B and 327K at CERs 320A, 320B and 320K where the logic of CS 310A is executed within respective containers. Similarly, certificates 481 for CS 310B may be propagated by the CPS to SCAs 327P and 327T at CERs 320P and 320T where the logic of CS 310B is executed within respective containers. The SCAs may use the new certificates as and when new inter-CS connections need to be set up. Traffic flows of existing in-use connections (which were set up using the initial set of certificates) may continue without disruption in the depicted embodiment. In some embodiments, clients may specify expiration periods for the certificates used for their applications' CSs, and/or other aspects of the rotation policy to be employed for the CSs (such as how much earlier than the expiration of a given certificate a corresponding rotated certificate should be acquired and propagated). In other embodiments, the CBAMS may enforce a default rotation policy.

Figure 5:
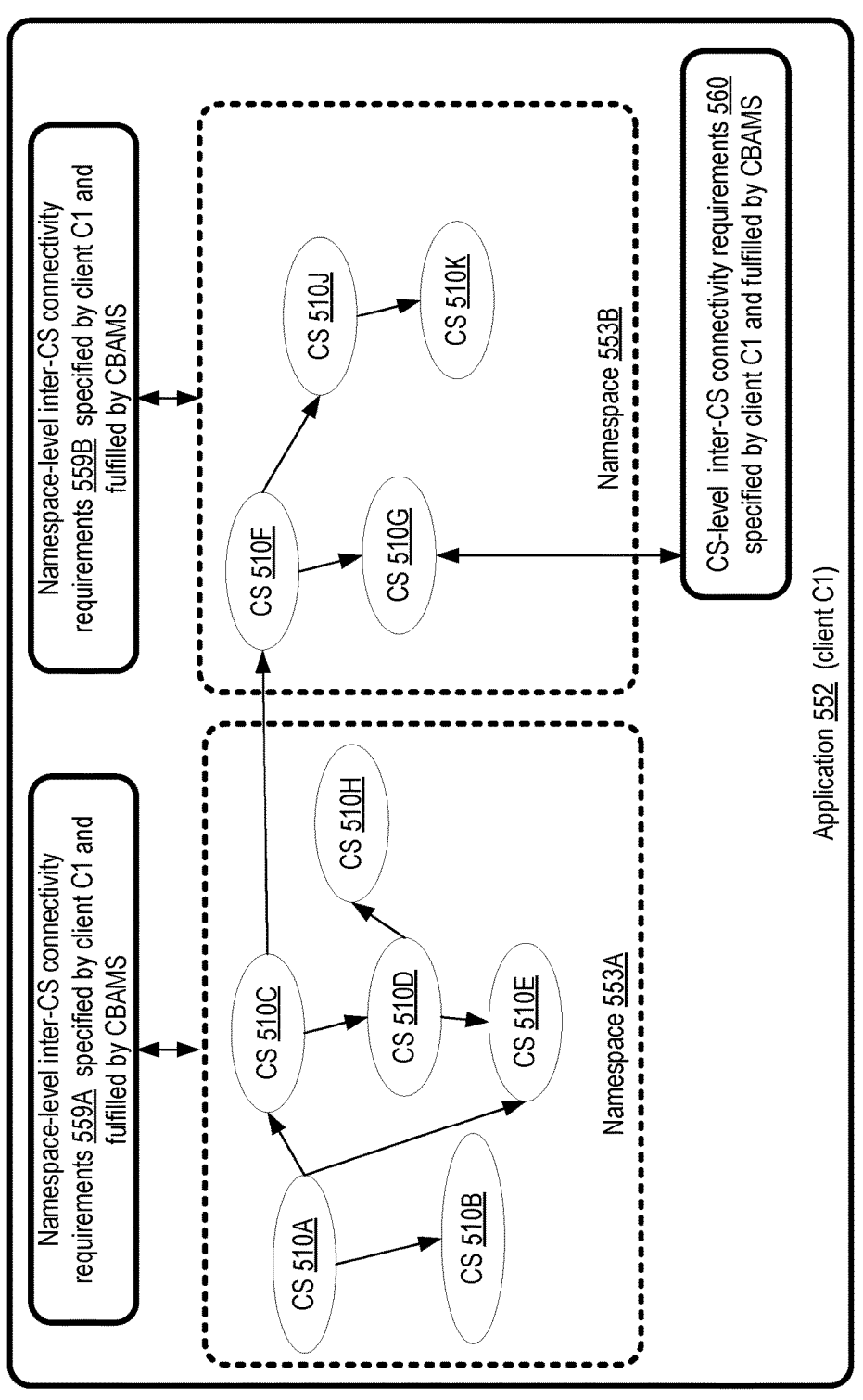
FIG. 5 illustrates an example scenario in which different sets of connectivity requirements may be specified by an application owner for namespaces comprising respective subsets of constituent services of the application, according to at least some embodiments.

FIG. 5 illustrates an example scenario in which different sets of connectivity requirements may be specified by an application owner for namespaces comprising respective subsets of constituent services of the application, according to at least some embodiments. In the depicted example, a distributed application 552 of a client C1 of a CBAMS comprises ten CSs. The client has utilized programmatic interfaces of the CBAMS to define two namespaces for the application: namespace 553A and namespace 553B. A namespace comprises a group of CSs which share a set of configuration parameters, such that the value of a given parameter may apply to all the CSs of a given namespace by default, and such that the value of that parameter may differ from one namespace to another. Namespace 553A comprises CS 510A, CS 510B, CS 510C, CS 510D, CS 510E and CS 510H of application 552, while namespace 553B includes CS 510F, CS 510G CS 510J and CS 510K. The arrows linking the CSs in FIG. 5 indicate flows of inter-CS requests.

The client C1 has indicated different inter-CS connectivity requirements for the namespaces 552A and 553B. Namespace-level inter-CS connectivity requirements 559A apply to the CSs of namespace 553A, while namespace-level inter-CS connectivity requirements 559B apply to the CSs of namespace 553B. In some embodiments in which a client specifies inter-CS connectivity requirements at a namespace granularity, and some CSs (such as CS 510C and CS 510F) which are expected to transmit messages to each other lie within different namespaces, the client may specify some requirements which apply to the traffic flowing between the namespaces separately from the namespace-level default requirements. The requirements for the namespaces may differ from one another in any of several aspects—e.g., the client may specify respective certificate authorities for the different namespaces, respective certificate rotation requirements, respective encryption algorithms for inter-CS messages, or even different versions of security algorithms. In some cases the security requirements may differ based on the locations at which different groups of CSs run—for example, some CSs may run in a different country or state than others, and compliance requirements with respect to local regulations may influence the connectivity requirements. The client C1 may specify the requirements, and the CBAMS may fulfill the requirements automatically without requiring further input or detailed configuration by the client in the depicted embodiment.

Clients of the CBAMS may specify inter-CS connectivity requirements at several levels in some embodiments: at the application level, at the namespace level, or at the level of individual CSs. For example, client C1 may use the CBAMS programmatic interfaces to indicate CS-level inter-CS connectivity requirements 560 that apply to CS 510G in the depicted embodiment. In some embodiments in which inter-CS connectivity requirements can be specified at several granularities, the requirements specified at the finer granularities may supersede the requirements specified at broader granularities in the event of a conflict—e.g., CS-level requirements may be given precedence over namespace-level requirements, and namespace-level requirements may be given precedence over application-level requirements.

Figure 6:
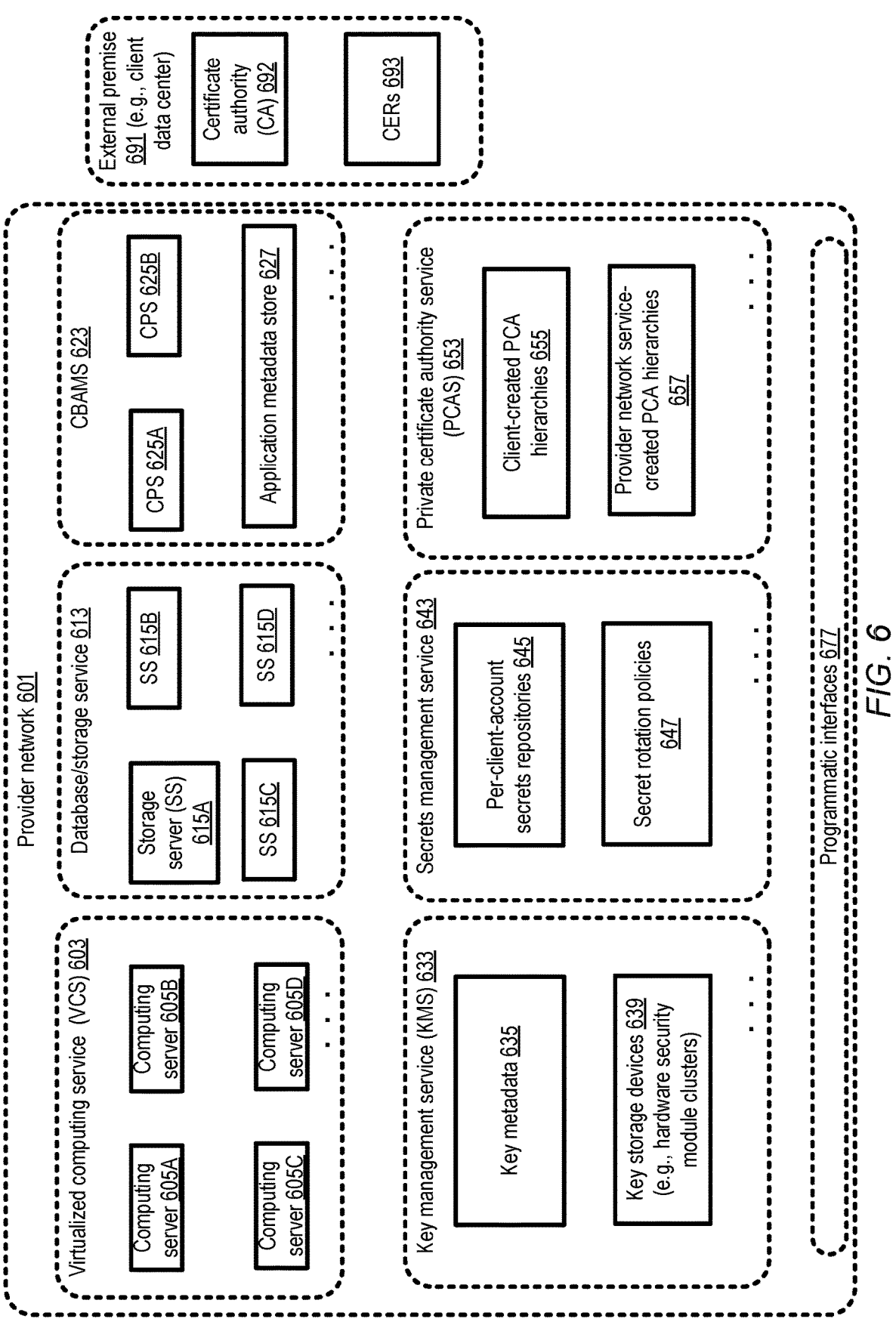
FIG. 6 illustrates an example provider network at which a container-based application management service may be implemented, according to at least some embodiments.

In some embodiments in which a CBAMS is implemented at a cloud provider network, the CBAMS may utilize one or more other services to fulfill the connectivity requirements of distributed applications. FIG. 6 illustrates an example provider network at which a container-based application management service may be implemented, according to at least some embodiments. Provider network 601 may include, in addition to CBAMS 623, at least a virtualized computing service (VCS) 603, a database/storage service 613, a key management service (KMS) 633, a secrets management service 643, and a private certificate authority service (PCAS) 653 in the depicted embodiment. CBAMS 623, similar in features and functionality to CBAMS 102 of FIG. 1, may comprise CPSs 625A and 625B, as well as an application metadata store 627 at which client-provided metadata such as CER cluster definitions, CS descriptors, and connectivity requirements may be stored.

VCS 603 may include a plurality of computing servers 605, such as 605A, 605B 605C and 605D in the depicted embodiment. Such computing servers may each host one or more compute instances or virtual machines which can be used as CERs. In some embodiments, as indicated earlier, CBAMS clients may indicate that one or more CERs 693 located at premises external to the provider network data centers, such as external premise 691, be utilized as CERs for some of the client's CSs. External premise 691 may, for example, comprise the client's own data center, or a data center of a different provider network operator in some embodiments. Data consumed or produced by the distributed applications of the client may be stored at storage servers (SS) 615 of a database/storage service 613 in the depicted embodiment, such as SS 615A, SS 615B, SS 615C or SS 615D.

In some embodiments in which digital certificates are used for secure connectivity establishment between CSs of distributed applications managed by the CBAMS, the certificates may be obtained from private certificate authorities hosted at PCAS 653. Clients of the CBAMS may establish client-created PCA hierarchies 655 at the PCAS by invoking PCAS APIs in the depicted embodiment. Other provider network services, such as the CBAMS itself, may establish PCA hierarchies at the PCAS by invoking such APIs in at least some embodiments, e.g., on behalf of clients of the CBAMS that wish to fully delegate certificate management tasks to the CBAMS. Certificate authorities that are part of client-created PCA hierarchies 655, or certificate authorities that are part of provider network service-created PCA hierarchies 657, may be used as the sources from which digital certificates are obtained by the CBAMS in the manner described earlier. In some embodiments, clients of the CBAMS may indicate that a certificate authority 692 at an external premise 691 be used for one or more CSs. In one such embodiment, in order to use the external certificate authority, a hierarchy of CAs that can be shared by the client's resources at external premises and by the CS execution resources within the provider network may be created—e.g., a subordinate CA may be created at the PCAS, such that it is part of the same chain of trust as the client's external CA. In some embodiments, root CAs may be used for the digital certificates used for CSs; in other embodiments, subordinate or non-root CAs may be used. Whether a root CA is to be used or a subordinate CA is to be use may be determined based on client-specified preferences in some embodiments, or based on default policies of the CBAMS in other embodiments.

Secrets management service 643 may provide a number of functions related to cryptographic artifacts and/or other sensitive data of provider network clients in the depicted embodiment. The secrets management service may comprise per-client-account secrets repositories 645, for example, within which encrypted versions of security artifacts (such as certificates and asymmetric keys associated with the certificates) may be stored at the request of CBAMS clients. The secrets management service may also enforce client-specified secret rotation policies 647 (such as policies for expiring and renewing digital certificates used for TLS connections of the kind discussed above) in some embodiments. In one embodiment, for example, the secrets management service may send advance notifications to the CBAMS CPSs to indicate when security secrets that have associated expiration times are going to expire, and the CPSs may then obtain new versions of the security secrets from the appropriate sources.

KMS 633 may enable its clients (which may include CBAMS clients) to create, manage, and control access to cryptographic keys that may be used for applications of the clients at other provider network services in some embodiments. The KMS may include a set of key storage services 639, such as clusters of hardware security modules (HSMs), and a set of client-specified key metadata 635 that governs access control to the keys generated or stored at the KMS on behalf the clients. Symmetric keys that are used to encrypt the security artifacts used for inter-CS connections may be generated and/or stored at the KMS on behalf of CBAMS clients in some cases. In some embodiments, the CBAMS may use the KMS to generate and store keys on the clients' behalf—that is, the clients may benefit from the security and functionality provided by the KMS without having to invoke the KMS APIs themselves. In some embodiments, the CBAMS may invoke functionality of other network-accessible services of the provider network (which are not shown in FIG. 6) to provide secure connectivity of the kind described above. Components of a given network-accessible service of a provider network may thus in general utilize components of other services in the depicted embodiment. Individual ones of the services shown in FIG. 6 may implement a respective set of programmatic interfaces 677 which can be used by external and/or internal clients (where the internal clients may comprise components of other services) in the depicted embodiment.

Figure 7:
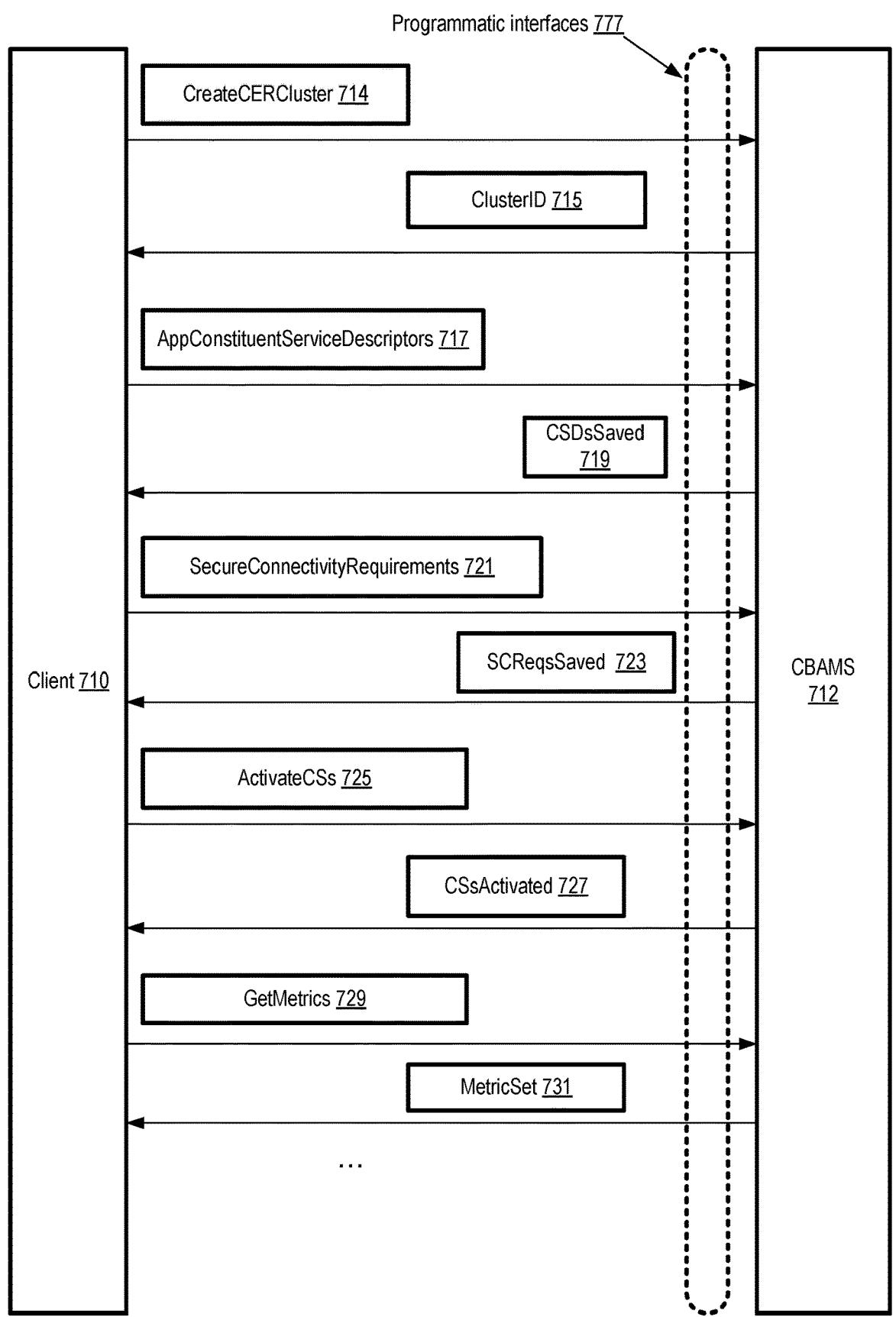
FIG. 7 illustrates example programmatic interactions between customers and a container-based application management service, according to at least some embodiments.

FIG. 7 illustrates example programmatic interactions between customers and a container-based application management service, according to at least some embodiments. CBAMS 712, similar in features and functionality to CBAMS 102 of FIG. 1, may implement a set of programmatic interfaces 777 in the depicted embodiment. Such interfaces may include, for example, a set of APIs, graphical user interfaces, command line tools, web-based consoles and the like in different embodiments. Using the programmatic interfaces, clients 710 (such as owners/administrators of distributed applications that are to be managed with the help of the CBAMS) may submit various kinds of requests or messages, and receive corresponding responses from CPSs of the CBAMS.

In some embodiments, a client 710 may submit a CreateCERCluster request 714 to the CBAMS, indicating the types of computing infrastructure components that are to be utilized for one or more distributed applications of the client. The client may, for example, indicate that compute instances of a VCS are to be used to run containers of the CSs of the applications, that CERs are to be dynamically provisioned by the CBAMS according to a server-less container execution methodology, and/or that specified computing devices at premises external to the provider network at which the CBAMS is implemented are to be used. Cluster creation requests may also indicate a number of other properties of the desired clusters in various embodiments, such as the operating systems to be used at the CERs, whether automated scaling is to be employed for the cluster and if so the parameters to be used for such auto-scaling (such as the minimum and maximum number of CERs), etc. A cluster with the requested properties may be created (i.e., metadata describing the properties may be stored at a CBAMS repository), and an identifier assigned to the cluster may be sent to the client in a ClusterID message 715.

The client may submit an AppConstituentServiceDescriptors message 717 in the depicted embodiment, indicating properties of one or more CSs of a distributed application which are to be executed at a specified CER cluster. The message 717 may, for example, provide identifiers of one or more software containers that are to be used for the CSs, indicate a minimum number of replicas of each CS that is to be maintained (e.g., one CS replica per CER), indicate user-friendly names and/or fully-qualified domain names that can be used by the different CSs to communicate with one another, and so on. In some embodiments, a client may define namespaces of the kind discussed in the context of FIG. 5 within a cluster, e.g., in the AppConstituentServiceDescriptors message or in the CreateCERCluster request. The client may use the AppConstituentServiceDescriptors to indicate the namespace (if any) to which individual ones of the CSs belong. The CS descriptors provided in message 717 may be saved at a repository of the CBAMS, and a CSDsSaved message 719 may be sent to the client.

In at least some embodiments, a client 710 may submit one or more SecureConnectivityRequirements messages 721 indicating that the CBAMS is to provide fully-managed secure connectivity via TLS or a similar protocol for network messages transmitted between CSs of an application. As indicated earlier, the connectivity requirements may be specified at any of several granularities or levels in different embodiments, such as the cluster-level, application-level, namespace-level, or CS-level. In some cases the client may wish to provide details such as the security protocol to be used, the sources of security artifacts to be used, encryption algorithms, artifact rotation requirements, and so on. In other cases, the client may simply indicate that secure connectivity is desired between the CSs, and leave the details and parameters to the CBAMS. The SecureConnectivityRequirements message may in some embodiments indicate to the CBAMS control plane that connectivity between individual CSs is to be established using Transport Layer Security (TLS) or a similar protocol, without obtaining networking information (such as addresses or routes) of the CSs from the client, and that digital certificates for establishment of the TLS connections among pairs of CSs are to be obtained and rotated automatically by the application management service without further certificate-related input from the client. The requirements may be saved at a CBAMS repository, and an SCReqsSaved message 723 may be sent to the client in some embodiments.

In some embodiments, a client may submit an ActivateCSs request 725, indicating that the CSs of a specified application be started up at the CERs of a cluster created earlier. In response, SCAs may be started up at the CERs, security artifacts needed for securing the inter-CS connections may be obtained and propagated to the SCAs, and programs implementing the CS logic may be started up at the containers indicted by the client when defining the CSs in the depicted embodiment. A CSsActivated message 727 may be sent to the client in some embodiments.

The CBAMS may collect a variety of metrics from the CERs as the client's application runs. The metrics may include, for example, resource utilizations at the CERs, the number of messages/packets transmitted between various CSs using secure connections managed by the CBAMS over time, the total amount of data transmitted over time via such connections, the number of certificate rotations completed, the number of API calls made by the CBAMS control plane to the certificate authorities being used for the client's application, and so on. The client may, as desired, submit one or more GetMetrics messages 729 to view such collected metrics. The requested metrics may be provided to the client via one or more MetricSet messages 731. Note that a different combination of programmatic interactions may be supported in some embodiments for configuring and managing secure inter-CS connectivity than those shown in FIG. 7.

Figure 8:
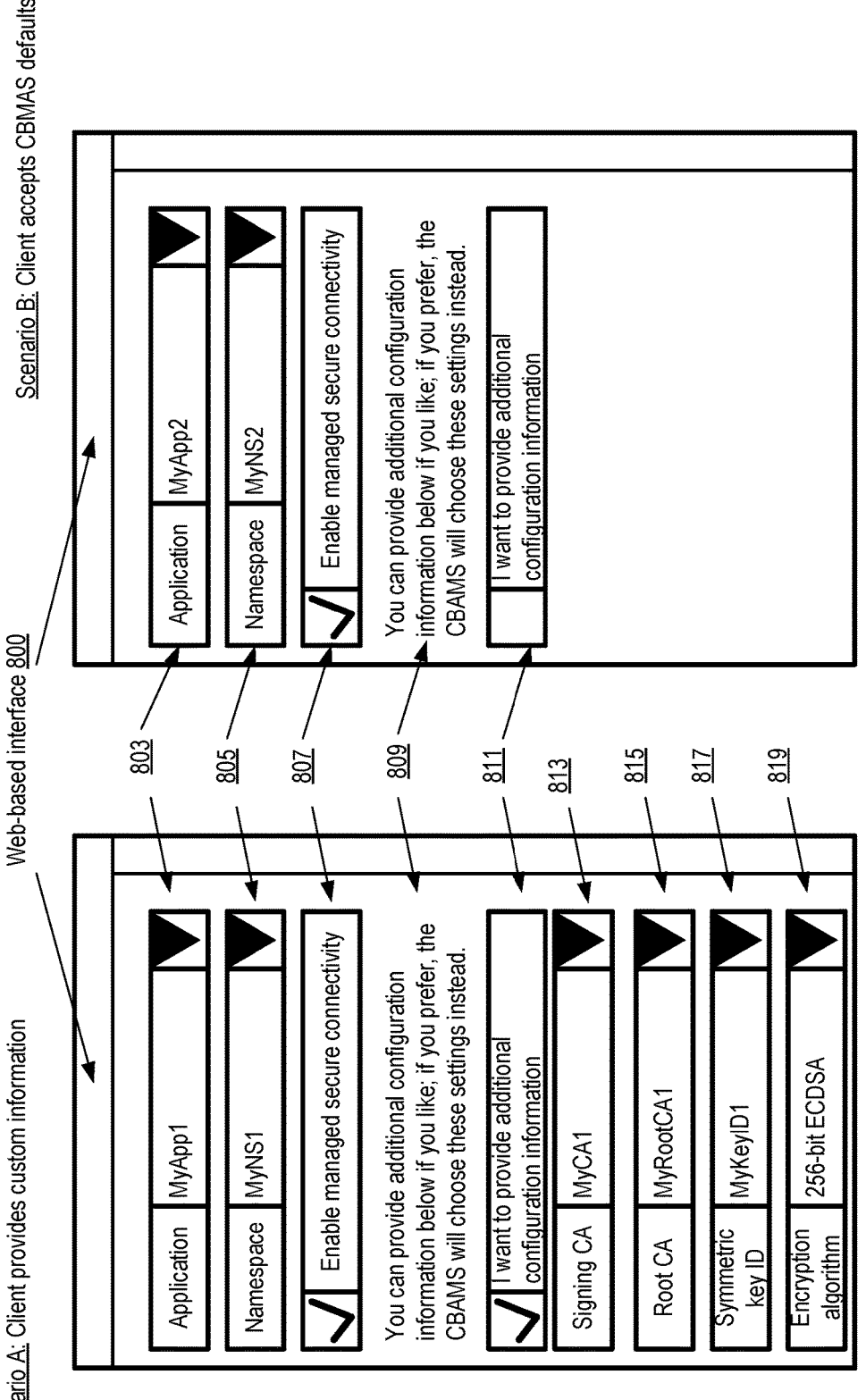
FIG. 8 illustrates an example graphical user interface which may be used to indicate parameters associated with managed secure connectivity between constituent services of an application, according to at least some embodiments.

As indicated earlier, some clients of a CBAMS may wish to provide more detailed configuration settings with regard to inter-CS connectivity requirements than other clients. FIG. 8 illustrates an example graphical user interface which may be used to indicate parameters associated with managed secure connectivity between constituent services of an application, according to at least some embodiments. A web-based interface 800 may be presented to a client of the CBAMS to enable the client to provide parameters at a desired level of customization or detail in the depicted embodiment.

In Scenario A, the client provides additional configuration preferences than in Scenario B. Element 803 of the web-based interface shows a drop-down menu area 805 that can be used to select, from among one or more distributed applications of the client, a particular distributed application (e.g., "MyApp1") for which inter-CS secure connectivity is desired using parameters provided by the client. In some embodiments, namespaces comprising groups of CSs of the distributed application which are to share at least some configuration settings may be created; drop-down menu area 805 may be used to specify the namespace (e.g., "MyNS1") for which the client is to specify parameters.

The check-box option 807 labeled "Enable managed secure connectivity" may be used by the client to indicate that fully-managed secure connectivity is desired for the CSs of the chosen namespace in the depicted scenario. Message area 809 may inform the client that additional configuration settings can be provided for the namespace's inter-CS traffic if the client desires.

In scenario A, the client has indicated, via check-box option 811, that the client wishes to provide additional configuration information for the namespace. Accordingly, the client may if desired identify a signing certificate authority ("Signing CA") (e.g., "MyCA1"), as indicated in element 813 and a root CA ("MyRootCA1") via element 815. If the client wishes to indicate an identifier of a symmetric key (such as "MyKeyID1") that should be used to encrypt security artifacts needed for setting up the connections between the CSs, element 815 may be used. If the client wishes to specify a particular encryption algorithm (e.g., "256-bit ECDSA") for encrypting/decrypting the inter-CS messages, element 819 may be used.

As shown in Scenario B, the client may simply let the CBAMS choose the details of the secure networking configuration, by not checking the box provided in element 811. In this case, no additional configuration settings may be needed from the client, thereby further reducing the effort required from the client. The CBAMS may choose parameters such as a signing CA, a root CA, a symmetric key, and/or the encryption algorithm based on default policies in the depicted embodiment in Scenario B. Note that in some embodiments, other combinations of custom configuration parameters may be chosen if desired by a client than the combination shown in FIG. 8. Furthermore, even if the client does choose to provide additional configuration information via an interface element similar to element 811, the client may not necessarily have to fill out all the parameters shown in elements 813, 815, 817 and 819 in some embodiments; instead, the client may fill out a subset of the parameters for which interface elements are revealed by checking the box of element 811 (e.g., the client may choose to select a signing CA and a root CA, while letting the CBAMS choose the symmetric key and the encryption algorithm).

FIG. 9 is a flow diagram illustrating aspects of operations which may be performed to support managed secure connectivity between constituent services of an application, according to at least some embodiments. As shown in element 901, a descriptor of a collection of execution resources (e.g., a cluster of compute instances, at each of which one or more software containers can be run) to be used for running CSs of a service-oriented distributed application of a client C1 may be received at a CPS (part of the control plane of a CBAMS) via programmatic interfaces from C1. In at least some embodiments, the collection of execution resources may be automatically scaled up or down based on criteria indicated to the CBAMS by the client C1; that is, the set of execution resources may grow or shrink over time.

A determination may be made by the CPS in the depicted embodiment, e.g., based on input received from C1 via the programmatic interfaces, that fully-managed secure connectivity between at least a subset of CSs (e.g., CSs that are part of a client-defined namespace) is to be implemented using a security protocol such as TLS (element 904). The input from the client may indicate, explicitly or implicitly, that the CBAMS is to be responsible for automatically setting up and monitoring the needed connections, acquiring security artifacts such as digital certificates used for the connections, rotating the artifacts as needed, etc., and that the client C1 is not to be required to provide routing information for the connections or perform other configuration tasks even if the CSs are scaled up or down over time.

In various embodiments, the CPS may acquire security artifacts needed for the type of secure connectivity requested by the client, assign the artifacts to respective CESs, and propagate the artifacts to respective secure connectivity agents (SCAs) at each of the execution resources to be used for the CSs (element 907). Any of several types of execution resources may be used, such as compute instances of a VCCS, client-owned servers at a premise external to the cloud computing environment at which the CBAMS runs, or dynamically provisioned resources of a server-less computing service implanted at the cloud computing environment. The artifacts may, for example, comprise CS-specific or per-CS digital certificates used during establishment of TLS connections for traffic between CSs. Such certificates may be obtained from certificate authorities (CAs) specified by the client or chosen by the CPS in different embodiments. In some embodiments, a private CA service of a provider network may be used. The artifacts may be obtained at the SCAs during initialization phases of the SCAs, prior to startup of the CSs themselves in at least some embodiments, so that the SCAs have all the materials needed for inter-CS connections in advance of connection requests from programs implementing the CSs.

As and when requests for connections to other CSs are generated at a given program/task of a CS on a given execution resource, the SCA on that execution resource may utilize the artifacts to set up secure connections (e.g., TLS connections) with an SCA at another execution resource at which the targeted CS runs (element 911). Data messages between the CSs may be transmitted, e.g., in encrypted form, via the SCA-to-SCA connections (element 914).

Per an artifact rotation policy (which may be chosen by the CBAMS or specified programmatically by the client C1), the CBAMS control plane may obtain refreshed/rotated security artifacts as needed, and propagate them to the SCAs (element 917) in the depicted embodiment. The policy may define the criteria for rotating the artifacts—e.g., that digital certificates used for TLS connections should be rotated once every H hours, or after a certain number of messages have been transmitted over a connection. Subsequent connections may use the newly-refreshed artifacts without requiring client actions for the rotations.

It is noted that in various embodiments, some of the operations shown in the FIG. 9 may be implemented in a different order than that shown in the figure, or may be performed in parallel rather than sequentially. Additionally, some of the operations shown in FIG. 9 may not be required in one or more implementations.

Figure 10:
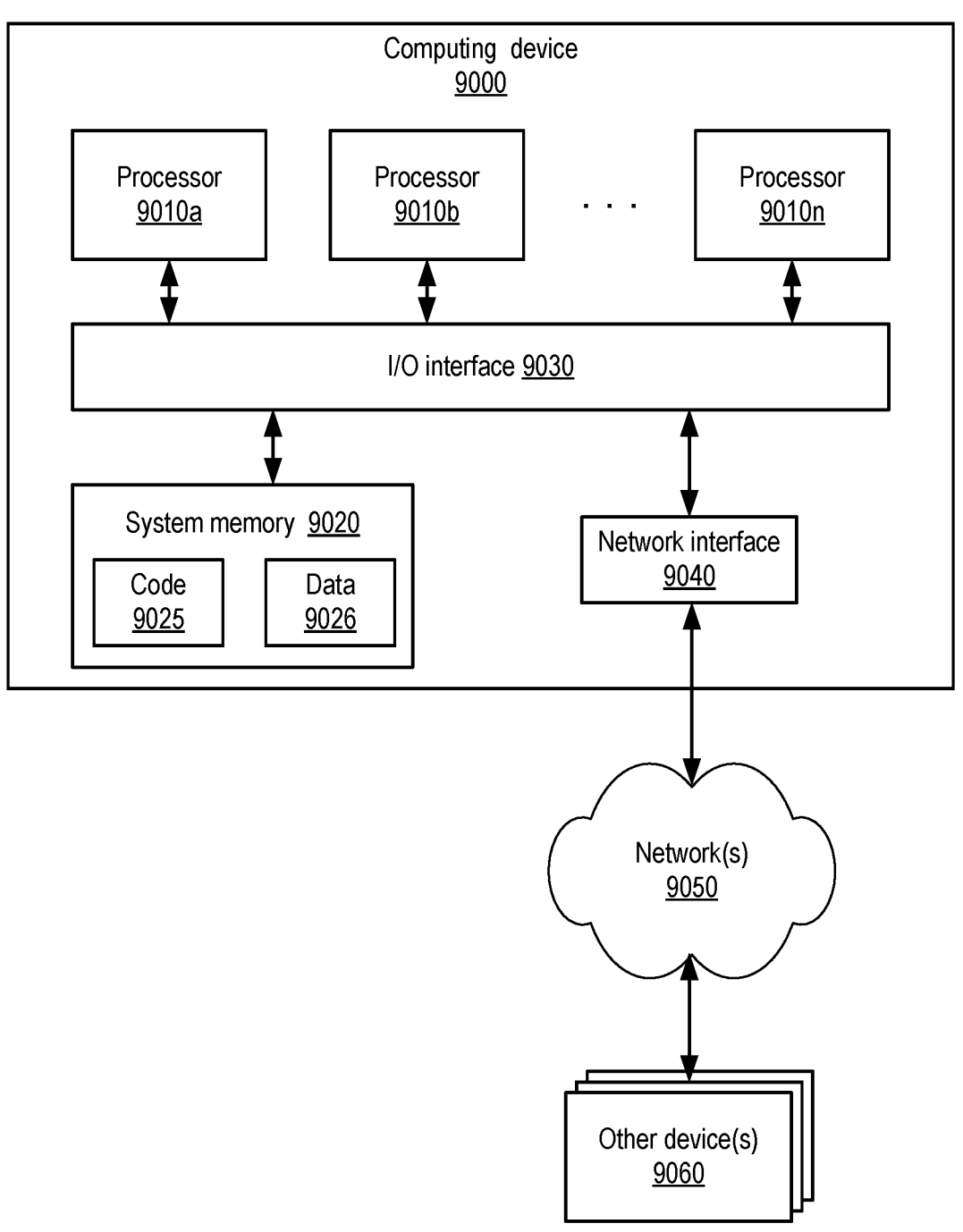
FIG. 10 is a block diagram illustrating an example computing device that may be used in at least some embodiments.

In at least some embodiments, a server that implements the types of techniques described herein (e.g., including the described functionality of components of a CBAMS and other provider network services), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a control plane server of an application management service of a cloud computing environment; and
a plurality of container execution resources, including a first container execution resource and a second container execution resource;
wherein the control plane server is configured to:
obtain, from a client of the application management service, a programmatic indication that (a) a plurality of constituent services of an application of the client is to be executed using at least the plurality of container execution resources, (b) connectivity between individual constituent services of the plurality of constituent services is to be established using Transport Layer Security (TLS), without obtaining networking information of the individual constituent services from the client and (c) digital certificates for establishment of TLS connections among pairs of constituent services of the plurality of constituent services are to be obtained and rotated automatically by the application management service;
propagate, to a first connectivity agent established by the application management service at the first container execution resource without receiving a request from the client to establish the first connectivity agent, a first digital certificate assigned by the control plane server to a first constituent service of the plurality of constituent services of the application for establishment of connections between the first constituent service and one or more other constituent services of the application, wherein the first digital certificate is generated by a certificate authority at the request of the control plane server, wherein the first digital certificate is propagated to the first connectivity agent during an initialization phase of the first connectivity agent prior to initiation of communication between a first program implementing the first constituent service within a first container at the first container execution resource and other programs implementing other constituent services of the application;
in response to determining that a criterion for automated certificate rotation has been satisfied by the first constituent service, propagate, to the first connectivity agent, a second digital certificate assigned by the control plane server to the first constituent service, wherein the second digital certificate is generated by the certificate authority at the request of the control plane server; and
wherein the first connectivity agent at the first container execution resource is configured to:
establish, using the first digital certificate, prior to receiving the second digital certificate, a first TLS connection with a second connectivity agent at the second container execution resource;
transmit, via the first TLS connection, to the second connectivity agent, one or more messages generated at the first program and directed to a second program implementing a second constituent service of the plurality of constituent services at a second container on the second container execution resource;
establish, using the second digital certificate, after receiving the second digital certificate, a second TLS connection with the second connectivity agent at the second container execution resource; and
transmit, via the second TLS connection, one or more messages generated at the first program and directed to the second program.

2. The system as recited in claim 1, wherein the control plane server is further configured to:
obtain, from the client, an indication of the certificate authority.

3. The system as recited in claim 1, wherein the certificate authority is implemented at a private certificate authority service of the cloud computing environment.

4. The system as recited in claim 1, wherein to propagate the first digital certificate to the first connectivity agent, the control plane server is further configured to:
cause an encrypted version of the first digital certificate to be transmitted to the first connectivity agent.

5. The system as recited in claim 1, wherein the first container execution resource comprises one of: (a) a compute instance of a virtualized computing service of the cloud computing environment or (b) a server located at a premise external to the cloud computing environment.

6. A computer-implemented method, comprising:
obtaining, at a control plane server of a network-accessible service of a cloud provider network, from a client, an indication that security artifacts used for establishment of connections among constituent services of a plurality of constituent services of an application are to be obtained automatically by the network-accessible service, without receiving input pertaining to individual security artifacts from the client;
transmitting, by the control plane server to a first connectivity agent established at a first execution resource, a first set of security artifacts assigned by the control plane server to a first constituent service of the plurality of constituent services of the application for establishment of connections between the first constituent service and one or more other constituent services of the application, wherein the first set of security artifacts is generated by an artifact source at the request of the control plane server, and wherein at least a portion of the first constituent service is run at the first execution resource;

establishing, by the first connectivity agent using at least the first set of security artifacts, a network connection with a second connectivity agent at a second execution resource at which at least a portion of a second constituent service is run; and transmitting, by the first connectivity agent to the second connectivity agent via the network connection, one or more messages generated at the first constituent service and directed to the second constituent service.

7. The computer-implemented method as recited in claim 6, wherein the first set of security artifacts comprises a digital certificate.

8. The computer-implemented method as recited in claim 6, further comprising:

obtaining, at the control plane server from the client, an indication of the artifact source.

9. The computer-implemented method as recited in claim 6, wherein the artifact source comprises a private certificate authority configured by the client.

10. The computer-implemented method as recited in claim 6, further comprising:

causing, by the control plane server, at least one artifact of the first set of security artifacts to be encrypted prior to transmission of the first set of artifacts to the first connectivity agent.

11. The computer-implemented method as recited in claim 6, further comprising:

obtaining, by the control plane server from the client, an identifier of a key to be used to encrypt at least a particular artifact of the first set of security artifacts; and causing, by the control plane server, the particular artifact to be encrypted using the key, without obtaining the key at the control plane server.

12. The computer-implemented method as recited in claim 6, further comprising:

obtaining, by the control plane server from the client, an indication of an encryption algorithm to be employed for messages transmitted between the first constituent service and other constituent services of the application; and causing, by the control plane server, the encryption algorithm to be employed by the first connectivity agent with respect to the one or more messages.

13. The computer-implemented method as recited in claim 6, further comprising:

causing, by the control plane server, an encrypted version of a particular security artifact of the first set of security artifacts to be stored, using an account of the client, at a secrets management service, wherein the encrypted version of the particular security artifact require one or more keys of the client for decryption, wherein the one or more keys are not accessible to the control plane server, and wherein transmitting of the first set of security artifacts to the first connectivity agent comprises transmitting the encrypted version of the particular security artifact to the first connectivity agent.

14. The computer-implemented method as recited in claim 6, further comprising:

in accordance with an artifact rotation policy, obtaining, by the control plane server, a second set of security artifacts from the artifact source; and transmitting, by the control plane server, the second set of artifacts to the first connectivity agent.

15. The computer-implement method as recited in claim 14, further comprising:

obtaining the artifact rotation policy by the control plane server from the client.

16. A non-transitory computer-accessible storage medium storing program instructions that when executed on a processor:

obtain, at a control plane server of a network-accessible service of a cloud provider network, from a client, an indication that security artifacts used for establishment of connections among constituent services of a plurality of constituent services of an application are to be obtained automatically by the network-accessible service, without receiving input pertaining to individual security artifacts from the client;

transmit, by the control plane server to a first connectivity agent established at a first execution resource, a set of security artifacts assigned by the control plane server to a first constituent service of the plurality of constituent services of the application for establishment of connections between the first constituent service and one or more other constituent services of the application, wherein the set of security artifacts is generated by an artifact source at the request of the control plane server, and wherein at least a portion of the first constituent service runs at the first execution resource;

establish, by the first connectivity agent using at least the set of security artifacts, a network connection with a second connectivity agent at a second execution resource at which at least a portion of a second constituent service of the plurality of constituent services runs; and transmit, by the first connectivity agent to the second connectivity agent via the network connection, one or more messages generated at the first constituent service and directed to the second constituent service.

17. The non-transitory computer-accessible storage as recited in claim 16, wherein the set of security artifacts comprises a digital certificate.

18. The non-transitory computer-accessible storage as recited in claim 16, storing further program instructions that when executed on the processor:

obtain, at the control plane server from the client, an indication of the artifact source.

19. The non-transitory computer-accessible storage as recited in claim 16, storing further program instructions that when executed on the processor:

cause, by the control plane server, at least one artifact of the set of security artifacts to be encrypted prior to transmission of the set of artifacts to the first connectivity agent.

20. The non-transitory computer-accessible storage as recited in claim 16, storing further program instructions that when executed on the processor:

obtain, by the control plane server from the client, an identifier of a key to be used to encrypt at least a particular artifact of the set of security artifacts; and cause, by the control plane server, the particular artifact to be encrypted using the key, without obtaining the key at the control plane server.

* * * * *